May 26, 1970 — K. B. DRAKE — 3,514,731
MAGNETIC CLAMP
Filed Nov. 30, 1967 — 2 Sheets-Sheet 1
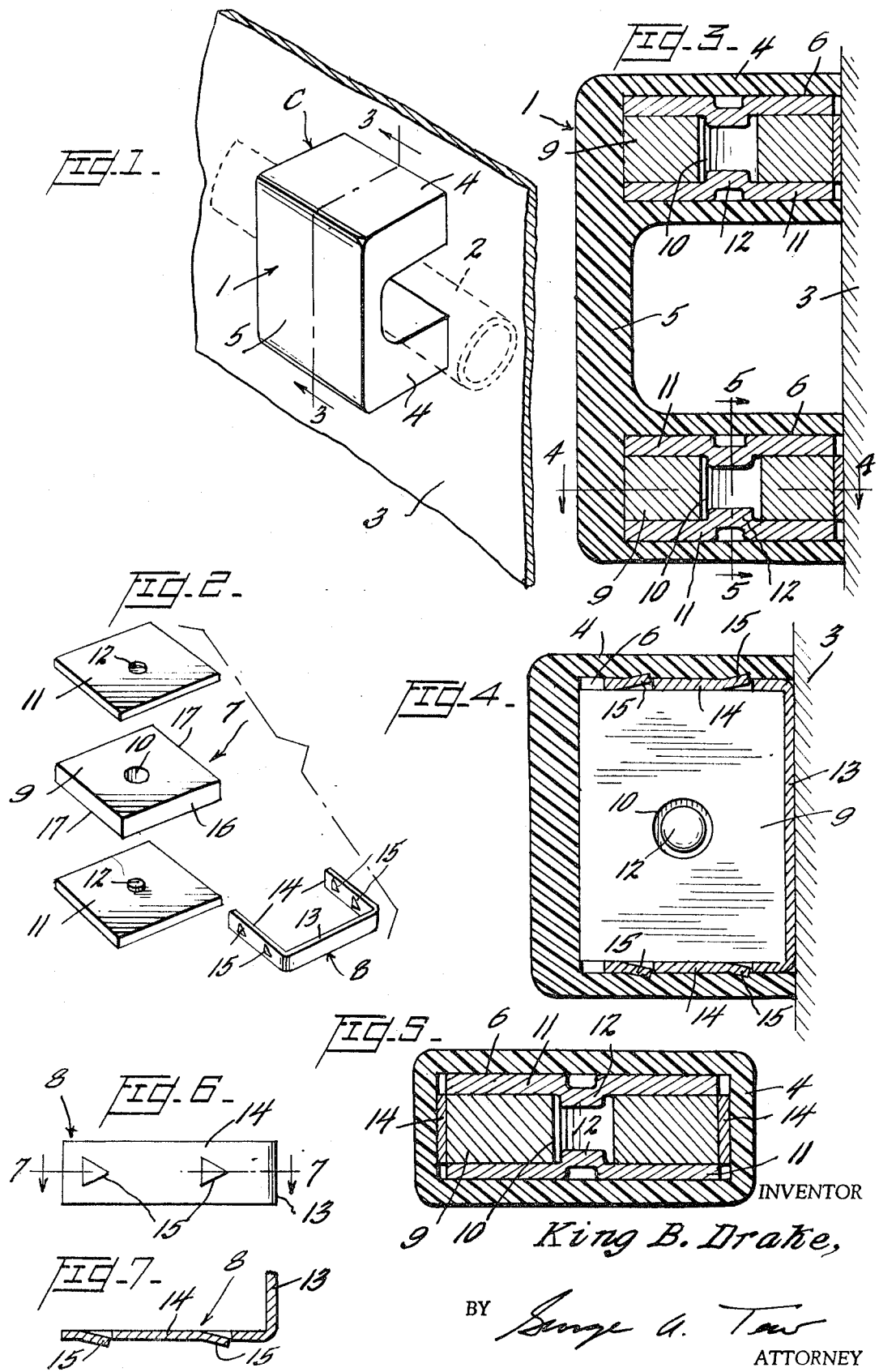
INVENTOR
King B. Drake,
BY
ATTORNEY

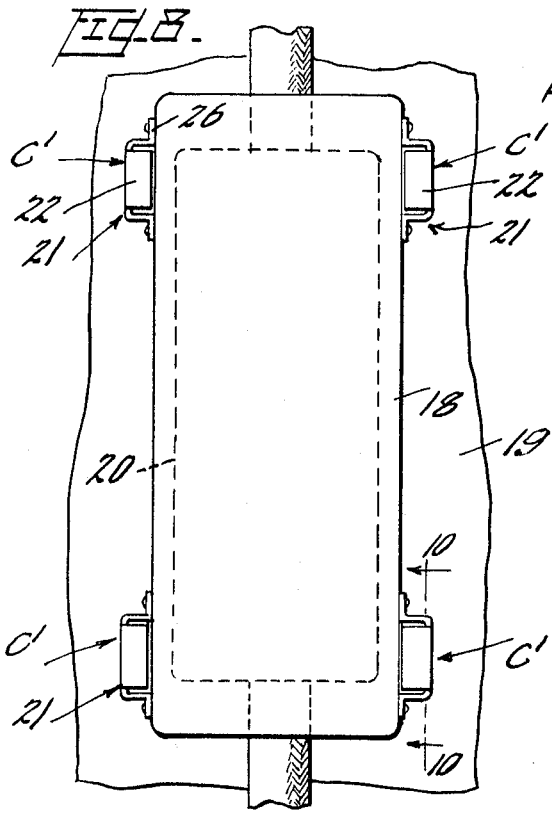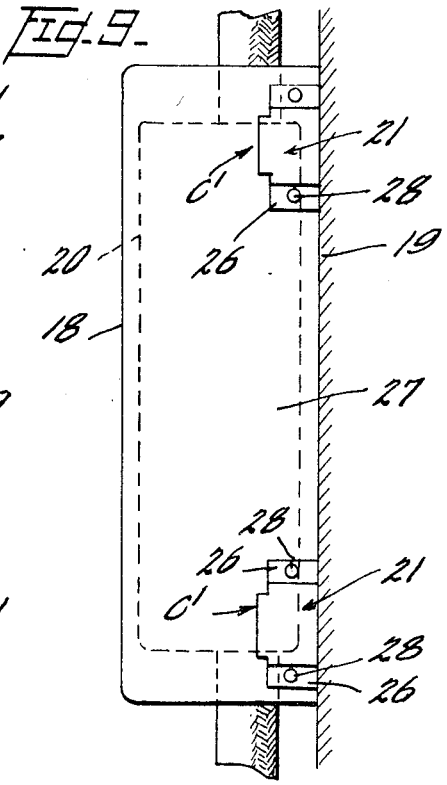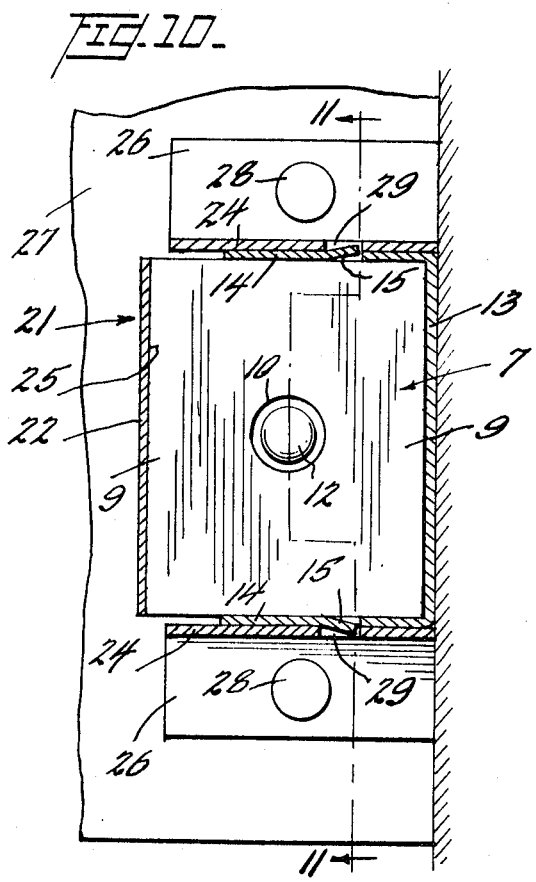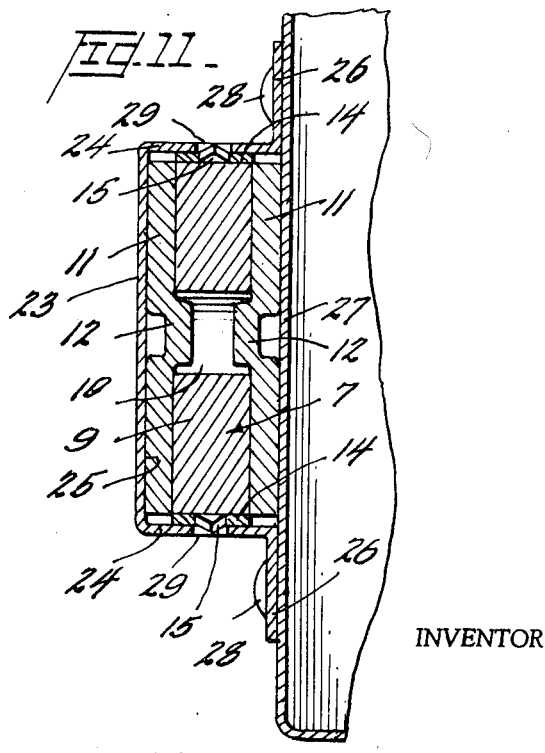

United States Patent Office 3,514,731
Patented May 26, 1970

3,514,731
MAGNETIC CLAMP
King B. Drake, 14307 Bessemer St.,
Van Nuys, Calif. 91401
Filed Nov. 30, 1967, Ser. No. 686,927
Int. Cl. H01f 7/20
U.S. Cl. 335—285
3 Claims

ABSTRACT OF THE DISCLOSURE

A supporting casing which is provided with a cavity in which a magnetic element is mounted for detachably securing the casing to a metallic surface, and means by which the magnetic element is securely held within the casing.

---

The magnetic clamp of the present invention was especially designed for holding various types of telephone equipment, such as cables, and removable covers for switches, connector blocks, amphenol plugs, etc., in place. Although the clamp is especially adapted for use with telephone equipment it is equally well adjusted for various other uses.

Magnetic clamps in which a magnetic element is mounted in a cavity formed in a casing are old and well known. In these prior devices the magnetic element comprises a rectangular permanently magnetized iron core and a pair of relatively thin rectangular armature plates which are permanently cemented or otherwise secured to the core, one on each side thereof. The element so formed is inserted into the cavity in the casing and is frictionally held or cemented therein. In prior devices, so constructed, it frequently happens that when the casing is removed from the surface to which it is applied the magnetic attraction between the surface and the magnetic element is so strong that the magnetic element is withdrawn from the cavity as the casing is removed from the surface.

It is therefore the principal object of this invention to eliminate this inherent defect in prior devices of this general character.

Another object of the invention is to eliminate the permanent securing of the armature plate to the sides of the magnetic core.

In accordance with the present invention I provide a casing having a cavity formed therein, a magnetic element which is adapted to be mounted in the cavity formed in the casing, and a clip by which the magnetic element is permanently secured within the cavity.

The magnetic element comprises a rectangular permanently magnetized iron core and a pair of relatively thin rectangular armature plates, the length and width of which are substantially the same as the length and width of the iron core.

The casing, which may be of plastic, wood, metal, or other suitable material, is made in various different sizes and shapes depending on the use for which the holder is intended. The length of the cavity in the casing, which is open at the upper end thereof, is a few thousands of an inch longer than the length of the magnetic element, the width thereof is a few thousands of an inch greater than the thickness of the magnetic element, and the depth thereof is substantially the same as the width of the magnetic element.

The clip by which the magnetic element is secured in the casing cavity is formed from a thin narrow strip of beryllium copper which has been bent into U-shape. The thickness of the strip is approximately five thousands of an inch and the width thereof is equal to the thickness of the magnetic core. The clip comprises a straight base section and a pair of spaced parallel similar end sections, one of which extends downwardly from each end of the base section perpendicular thereto. The length of the base section, between the end sections, is equal to the length of the magnetic core, and the length of the end sections is slightly less than the width of the magnetic core and the depth of the casing cavity. Each of the end sections is provided with one or more sharp pointed barbs which are struck from the end sections and extend outwardly and upwardly therefrom.

The clip is applied to the core of the magnetic element, between the armature plates thereof, with the base section of the clip in contact with the upper edge of the core and the side sections thereof in contact with the ends of the core. The magnetic element, with the clip applied thereto, is then forced into the cavity in the casing until the upper edge of the element is flush with the outer surface of the casing. The magnetic element will then be retained in the cavity by the barbs on the end sections biting into the end walls of the cavity.

Having stated the principal objects of the invention other and more limited objects thereof will be apparent from the following specification and the accompanying drawings forming a part thereof in which:

FIG. 1 is a perspective view showing a magnetic clamp constructed according to my invention applied to a metal surface for holding an electric cord or the like in place;

FIG. 2 is a perspective view of the magnetic element of the clamp showing the component parts thereof in separated condition;

FIG. 3 is a greatly enlarged vertical sectional view taken on the lines 3—3 on FIG. 1;

FIG. 4 is a horizontal section taken on the line 4—4 on FIG. 3;

FIG. 5 is a vertical section taken on the line 5—5 on FIG. 3;

FIG. 6 is an enlarged end elevation of the clip by which the magnetic element is retained in the clamp casing;

FIG. 7 is a horizontal section taken on the line 7—7 on FIG. 6;

FIG. 8 is a front elevation of a cover showing it secured to a metal plate about an instrument by a plurality of a slightly modified type of clamp;

FIG. 9 is a side elevation of the cover and clamps shown in FIG. 8;

FIG. 10 is an enlarged sectional view taken through the clamp on the line 10—10 on FIG. 8; and FIG. 11 is a section taken on the line 11—11 on FIG. 10.

Having generally described a magnetic clamp constructed according to my invention, it will now be specifically described in connection with the drawings with the use of reference characters.

Referring first to FIGS. 1 to 7 of the drawings, in which one embodiment of the invention is shown, the letter C indicates generally a clamp which is adapted to removably clamp an electric cord 2, such as a telephone or electric light cord shown in dotted lines in FIG. 1, in place to a metal surface 3. The clamp C comprises a plastic U-shaped casing 1 having a pair of spaced parallel end sections 4 which are connected together at one end thereof by an integral base section 5. Each of the end sections 4 has a rectangular cavity 6 formed therein which is open at the outer end thereof. A magnetic element, generally indicated by the numeral 7, is mounted in each of the cavities 6 and is retained therein by a U-shaped clip generally indicated by the numeral 8.

The magnetic element 7 comprises a rectangular permanently magnetized iron core 9, having a centrally disposed circular aperture 10 therein, and a pair of similar relatively thin rectangular steel armature plates 11 having a small centrally disposed short circular stud 12 which extends outwardly from one side thereof. Studs 12 are smaller in diameter than the aperture 10 in which they are disposed so that the armature plates 11 have limited freedom of motion along the faces of core 9 on which they are magnetically attached. One of the armature plates 11 is applied to each side of the core 9 with the studs 12 thereof extending into the aperture 10 in the core 9. The armature plates 11 are held against the sides of the core 9 by the magnetic attraction between the core 9 and the armature plates 11.

The U-shaped clip 8 by which the magnetic elements 7 are secured within the cavities 6 comprises a straight base section 13 and a pair of spaced parallel side sections 14 which are integral with and extend downwardly from the base section 13, one at each end thereof. Each of the side sections 14 is provided with a pair of resilient sharp pointed barbs 15 which are struck out from the end sections. The clip 8 is formed from a very thin strip of beryllium, copper, the width of which is approximately the same as the thickness of the core 9. The length of the base section 13 betwen the side sections 14 is equal to the length of the core 9, and the length of the side sections 14 is slightly less than the width of the core 9. In mounting a magnetic element 7 in one of the cavities 6 in the casing 1 the clip 8 is first applied to the core 9 with the inner surface of the base section 13 in contact with the outer edge 16 of the core 9, and the inner surfaces of the side sections 14 in contact with the side edges 17 of the core 9. The magnetic element 7 with the clip 8 applied thereto is then forced downwardly into the cavity 6 until the outer end of the magnetic element 7 is flush with the open outer end of the cavity 6. The cord 2 is then inserted between the end sections 4 of the clamp casing 1 and the clamp applied to the metal surface 3 where it is held by the magnetic attraction between the magnetic element 7 and the surface 2. Any outward force applied to the casing 1, when removing the clamp from the surface 3, which tends to withdraw the casing 1 from the magnetic element 7 adhering to the surface 3, causes the barbs 15 to bit into the end walls of the cavities 6 whereby the magnetic elements 7 are retained within the cavities 6 and withdrawn from the surface 3 along with casing 1.

In FIGS. 8 to 11 a plurality of a slightly modified type of clamp C' are shown applied to a cover 18 for removably securing it to a metal plate 19 about an instrument 20. In this type of clamp the casing 21 thereof comprises a bottom wall 22, a side wall 23, and a pair of end walls 24 which define a rectangular cavity 25, which is open at one side and the upper end thereof, in which the magnetic element 7 is mounted and retained by the clip 8. The end walls 24 are each provided with an outwardly extending flange 26 by which the casing 21 is riveted or otherwise secured to the side wall 27 of the cover 18, with the open side of the cavity 25 against the side wall 27 of the cover 18. The side wall 27 therefore constitues the other side wall of cavity 25. The casing 21 is made of hard metal into which the barbs 15 of the clip 8 will not bite. The end walls 24 of the cavity 25 are therefore provided with apertures 29 into which the barbs 15 snap when the magnetic element 7, with the clip 8 applied thereto, is forced into the cavity 25.

From the foregoing it will be apparent that I have provided a very simple and effective means for accomplishing the objects of the invention.

It is to be understood that I am not limited to the specific construction shown and described herein as various modifications may be made therein within the spirit of the invention and the scope of the appended claims.

What is claimed is:

1. A magnetic clamp comprising:
   a casing, a substantially rectangular cavity in said casing, said cavity being open at one end thereof at one face of said casing;
   a magnetic element in said cavity, said magnetic element comprising a substantially rectangular magnetized core having opposite faces, an aperture through said core from one face to the other thereof, a substantially rectangular armature plate lying against each of said faces of said core, each of said armature plates having a stud thereon, which stud extends into said aperture in said core and is of smaller diameter than said aperture in said core so that said armature plates are movable along said faces a distance which is limited by said studs in said aperture;
   retaining means for retaining said magnetic element in said cavity, said retaining means comprising a U-shaped clip, said clip having a base and a pair of end sections, said base lying against said magnetic core at the side of said magnetic core direction toward the open end of said cavity, said base being no wider than said magnetic core is thick so that said armature plates are free with respect to said retaining means; and
   said end sections of said retaining means extending from said base section, one at each end thereof, and extending around said sides of said magnetic core into said cavity, said end sections being positioned between said magnetic core and the walls of said cavity, each of said end sections having a sharp barb extending therefrom and engaging the walls of said cavity to retain said core in said cavity so that said core retains said armature plates with limited freedom of motion with respect to said cavity.

2. The magnetic clamp means of claim 1 wherein said U-shaped clip is formed of a thin, narrow, metal strip of non-magnetic material, said strip being of substantially uniform, rectangular cross section throughout the length of said strip, said barb on each of said end sections of said strip being stamped therefrom, said casing being made of sufficiently soft material that said barbs can engage into said casing material to retain said magnetic element within said casing.

3. A clamp comprising:
   a pair of spaced, parallel end sections, each of said end sections having a face, said faces of said end sections lying substantially in a common plane, a base connected to each of said end sections to secure said end sections with respect to each other, said base section being spaced from the plane of said faces so as to define a U-shaped clamp casing, which can be engaged over an elongated member and restrain the elongated member;
   each of said end sections having a cavity therein, a magnetic element being positioned within each of said cavities, retaining means for securing each said magnetic element within its cavities, said magnetic elements being for retaining said casing with respect to an iron surface lying substantially in the plane of said faces;
   said magnetic elements comprising a magnet core having substantially parallel opposite faces thereon, an aperture through said magnet core extending from one face to the other of said magnet core, first and second iron armature plates lying against said faces, each of said armature plates having a stud thereon, said stud being of smaller size than said aperture and extending into said aperture so that said armature plates have limited motion along said faces of said magnet core;
   said retaining means for retaining each of said magnetic elements within its respective cavity comprising a U-shaped clip of substantially non-magnetic material, said clip having a central base section and end sections attached thereto, said base section extending across said magnet core at the side thereof adjacent the face of said casing, said base being sufficiently narrow so that said armature plates are unrestrained by said base, said side sections extending into said cavity adjacent the edges of said magnet core so that said clip engages only said magnet core and the walls of said cavity, engagement means on said side sections, said engagement means engaging the sides of said cavity to retain said magnet core in said cavity.

References Cited

UNITED STATES PATENTS

| | | | |
|---|---|---|---|
| 2,888,291 | 5/1959 | Scott et al. | 292—251.5 |
| 2,935,353 | 5/1960 | Loeb | 292—251.5 |
| 2,950,140 | 8/1960 | Stone | 292—251.5 |
| 3,151,902 | 10/1964 | Ahlgren | 292—251.5 |
| 3,418,018 | 12/1968 | Marburger et al. | 292—251.5 |
| 2,721,717 | 10/1955 | Wales. | |
| 2,844,291 | 7/1958 | McPheeters | 335—285 XR |
| 2,962,318 | 11/1960 | Teetor | 335—285 XR |
| 3,110,516 | 11/1963 | Sukala | 335—285 XR |
| 3,235,302 | 2/1966 | Benson | 335—285 XR |

FOREIGN PATENTS 707,857   4/1965   Canada.

GEORGE HARRIS, Primary Examiner

U.S. Cl. X.R.

248—206; 292—251.5